United States Patent [19]

Gillon, Jr.

[11] Patent Number: 4,760,694
[45] Date of Patent: Aug. 2, 1988

[54] BI-LEVEL THRUSTER

[75] Inventor: Willard A. Gillon, Jr., Canoga Park, Calif.

[73] Assignee: Rockwell International Corporation, El Segundo, Calif.

[21] Appl. No.: 923,615

[22] Filed: Oct. 27, 1986

[51] Int. Cl.$^4$ .............................. F02G 1/00; F02G 3/00
[52] U.S. Cl. .................................. 60/200.1; 137/599.2
[58] Field of Search .............................. 60/200.1, 741; 137/599.2; 239/585, 584, 583; 222/3, 504, 482

[56] References Cited

U.S. PATENT DOCUMENTS

| 2,187,834 | 1/1940 | Mantz | 137/599.2 |
| 2,863,473 | 12/1958 | Gantz | 137/599.2 |
| 3,088,406 | 5/1963 | Horner | 102/49 |
| 3,105,671 | 10/1963 | Teitelbaum et al. | 60/200.1 |
| 3,304,723 | 2/1967 | Gaura | 60/200.1 |
| 3,330,114 | 7/1967 | McQueen | 60/200.1 |
| 4,258,546 | 3/1981 | Stratton | 60/259 |
| 4,428,188 | 1/1984 | Turanksy et al. | 60/225 |
| 4,624,282 | 11/1986 | Fargo | 137/599.2 |

FOREIGN PATENT DOCUMENTS 3106730 9/1982 Fed. Rep. of Germany ... 137/599.2

Primary Examiner—Louis J. Casaregola
Assistant Examiner—Donald E. Stout
Attorney, Agent, or Firm—H. Frederick Hamann; Harry B. Field; David C. Faulkner

[57] ABSTRACT

A compact, lightweight thruster assembly (10) is provided consisting of a dual armature piston assembly (24). A single solenoid coil (46) operates either or both armatures (26), (34) depending on the level of applied current to effect either of two levels of predetermined impulse emitting from the thruster nozzle (20).

3 Claims, 1 Drawing Sheet

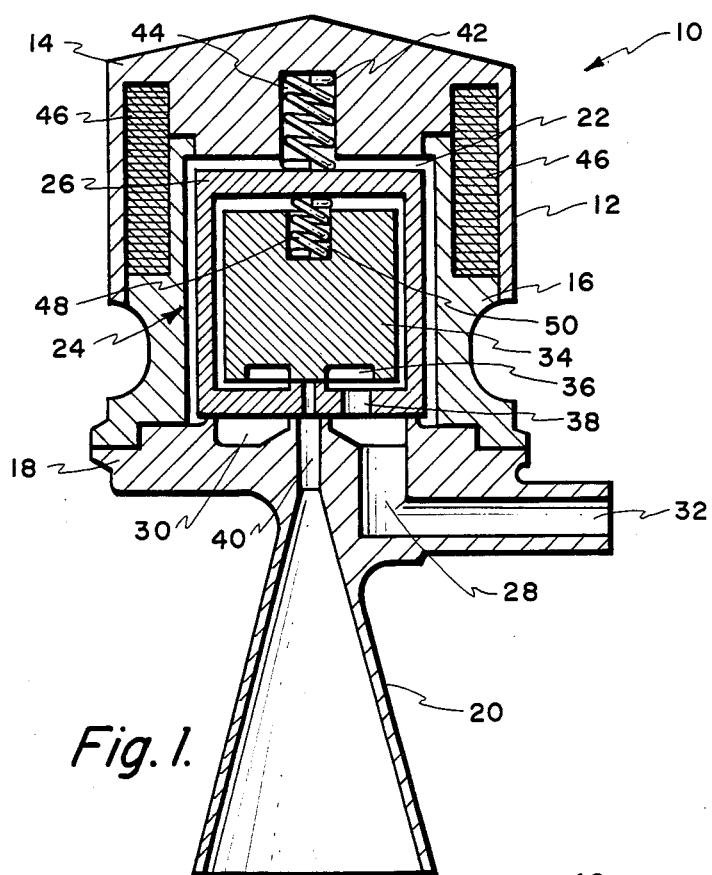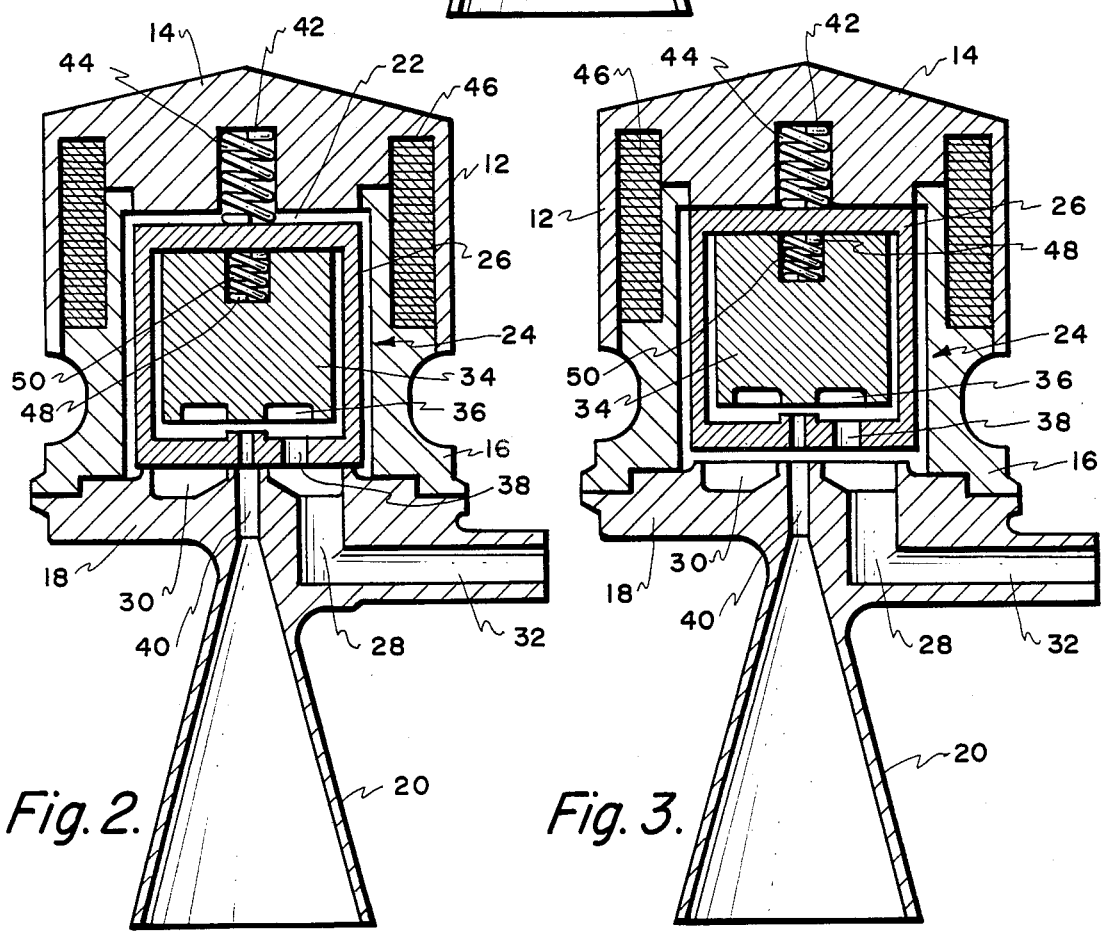

BI-LEVEL THRUSTER

BACKGROUND OF THE INVENTION

1. Technical Field

The present invention relates to a gas thruster assembly for producing a predetermined quantum of impulse for attitude control of vehicles such as satellites, missiles, spacecraft, and the like. More particularly, the present invention relates to an apparatus for selectively delivering either of two levels of impulse or thrust upon command and if desired in a repetitive fashion.

2. Background Art

Various propulsion systems, discused below and incorporated herein by reference, have been proposed for controlling the attitude or relative positions of a vehicle.

For example, Stratton (U.S. Pat. No. 4,258,546) describes a propulsion system for use in spin-stabilized vehicles including a liquid or fluid-fueled rocket engine having a thrust chamber, a differential area piston dividing the thrust chamber into a charging chamber and a combustion chamber. This system utilizes the spin forces of the vehicle or a propellant expulsion system for delivering fuel from a storage container to the charging chamber and means for initiating movement of the piston to drive fuel from the charging chamber to a combustion chamber.

As noted in Turansky et al (U.S. Pat. No. 4,428,188), control of a space vehicle along three mutually orthogonal axes is realized by utilizing a bistable valve arrangement which may feed, sequentilly, two opposite directed thrusters. This is accomplished by providing an electromagnetically functioned valve assembly.

A quantitized impulse rocket is described by Horner (U.S. Pat. No. 3,088,406). Specifically, the Horner impulse rocket is designed to precisely inject a predetermined amount of fuel into a combustion chamber which is independent of the thrust generated by the rocket. This is accomplished by utilizing an injection pump including a piston assembly having dual solenoid valves which when activated allows the injection of the entire amount of predetermined quantities fo fuel and oxidizer stored within the injector pump cylinder into the combustion chamber.

BRIEF SUMMARY AND OBJECTS OF THE INVENTION

The impulse thruster of the present invention is simple, compact and light in weight. The design and functioning of this thruster assembly is particularly adapted to provide small or large attitude corrections in, for example, satellite maneuvering systems or space platforms.

The thruster assembly incorporates a telescopic bi-valve double piston assembly slidably mounted within a chamber of the thruster housing.

Accordingly, it is an object of the present invention to provide an improved thruster assembly.

Another object of the invention is to provide a compact lightweight thruster assembly capable of producing either of two predetermined levels of thrust.

These and other objects and features of the present invention will be apparent from the following detailed description, taken with reference to the accompanying drawings.

BRIEF DESCRIPTION OF THE DRAWINGS

FIG. 1 is a cross-sectional view of the thruster assembly constructed in accordance with the present invention.

FIGS. 2 and 3 are cross-sectinal views of the thruster assembly showing the phased or selective operation of the thruster assembly to produce a predetermined quantum of thrust.

DETAILED DESCRIPTION OF THE INVENTION

Referring to the drawings, FIG. 1 shows a bi-level gas thruster assembly 10 according to the present invention comprising a thruster housing 12 including a core portion 14 and a base portion 16. The thruster housing base portion 16 includes a nozzle base 18 and a nozzle 20 from which a select quantity of impulse fluid may be emitted.

An inner chamber 22 formed by the thruster housing 12 and nozzle base 16 houses a telescopic bi-valve double piston assembly 24 slidably mounted therein. The piston assembly further comprises an outer cylindrically shaped armature 26 slidably seated within the thruster assembly inner chamber 22. A fluid passageway 28 communicates with a first fluid annulus 30 formed in the nozzle base 16 and a nozzle base fluid inlet 32. An inner cylindrical shaped armature 34 is slidably seated within the outer cylindrically shaped armature 26 and a second fluid annulus 36 is formed within the base portion of the inner armature. The second fluid annulus 36 communicates with the first fluid annulus 30 in the nozzle base 16 by fluid passageway 38. A nozzle fluid conduit 40 within the nozzle base 16 and outer armature base provides for the passage of fluid from either the first annulus 30 or both annuli 30,36 into the thruster nozzle 20.

In addition, as shown in the figures, the thruster assembly 10 is provided with a first resilient member such as spring 42 disposed within a recess 44 centrally positioned in the thruster housing core 14. This recess 44 and spring 42 retained therein is located intermediate an energizable annular coil 46 in surrounding relationship with the armatures 26,34 and proximate an axial midpoint of the outer armature. Spring 42 is functionally engaged with the outer cylindrically shaped armature 26. A second resilient member 48 is disposed within a recess 50 formed within the inner armature 34. This recess 50 as seen in the figures is in axial alignment with the first spring 42 and functionally associated with the inner armature 34.

In operation the annular solenoid coil 46 may operate either or both armatures depending upon the level of applied current. In other words, the inner armature 34 will contract away from the nozzle base 16 due to the field flux produced by the solenoid coil. While the low level of applied current is sufficient to compress spring 48, by functioning the inner armature 34, it is insufficient to function the outer armature 26 and compress spring 42 contained in recess 44.

When the inner armature 34 is functioned by the application of the low current, pressurized fluid such as hydrogen, oxygen or nitrogen which may be introduced through fluid inlet 32, enters into the first fluid annulus 30 associated with the nozzle base 18. Since the outer armature 26 is in abutting relationship with the nozzle base, pressurized fluid flows through passageway 28 into annulus 30 through passageway 38 and into annulus 36. As seen in FIG. 2 the armature 34 has contracted or drawn away from the outer armature in a direction opposite or away from the nozzle exit. This allows the fluid to now flow through the inner annulus 36 into conduit 40 which empties into nozzle 20.

Referring now to FIG. 3 the application of additional current sufficient to activate the outer armature 26 will place both the inner and outer armatures 34,36 in a contracted position relative to nozzle 20. With both the inner and outer armatures in a contracted position, dual passageways are provided which allows pressurized pulsing fluid to flow directly from annulus 30 into conduit 40 which combines with fluid flowing from annulus 36 into conduit 40, and in this fashion, a predetermined, controllable and repetitive level of impulse or thrust may be effected utilizing the thruster assembly of the present invention.

It is to be understood from the preceding description that actuation of either or both armatures will control the flow of pressurized fluid realized.

It will of course be realized that various modifications can be made in the design and operation of the present invention without departing from the spirit thereof. Thus, while the principle, preferred construction, and mode of operation of the invention have been explained, it should be understood that within the scope of the appended claims the invention may be practiced otherwise than as specifically illustrated and described.

What is claimed and desired to be secured by Letters Patent of the United States is:

1. A thruster assembly for producing pre-determined levels of impulse comprising:
   (a) a thruster housing including a core portion, a base portion, a nozzle base, a nozzle and a nozzle exit;
   (b) an inner thruster assembly chamber formed by the thruster housing and nozzle base, the assembly chamber further comprising an outer cylindrically-shaped armature slidably seated within the thruster assembly chamber and an inner cylindrically-shaped armature slidably seated within the outer cylindrically-shaped armature;
   (c) a bi-valve double piston assembly slidably mounted within the chamber;
   (d) fluid annuli formed within the chamber communicating with the piston assembly and nozzle;
   (e) fluid passageways formed within the chamber interconnecting and communicating with the piston assembly, fluid annuli and nozzle;
   (f) a fluid inlet formed within the nozzle base communicating with the fluid annuli, passageways and a fluid conduit associated with the nozzle;
   (g) resilient means associated with the piston assembly; and
   (h) driving means for energizing the assembly disposed within the thruster housing in surrounding relation to the piston assembly.

2. A thruster assembly according to claim 1 in which the resilient means comprises a first spring disposed within a recess centrally positioned in the thruster housing core portion intermediate an annular coil and proximate a mid-point of the outer armature and functionally engaged therewith; and
   a second spring disposed within a recess formed within the inner armature in axial alignment with the first spring and functionally associated with the inner armature.

3. A thruster assembly according to claim 2 in which the annular coil is energizable.

* * * * *